United States Patent
Kim et al.

(10) Patent No.: US 7,325,590 B2
(45) Date of Patent: Feb. 5, 2008

(54) COOLING APPARATUS FOR PORTABLE COMPUTER

(75) Inventors: Ye Yong Kim, Suwon (KR); Ki Tak Ko, Busan (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 10/965,794

(22) Filed: Oct. 18, 2004

(65) Prior Publication Data
US 2005/0103477 A1 May 19, 2005

(30) Foreign Application Priority Data
Nov. 14, 2003 (KR) ................ 10-2003-0080761
Nov. 28, 2003 (KR) ................ 10-2003-0085656

(51) Int. Cl.
*F28D 15/00* (2006.01)
*H05K 7/20* (2006.01)

(52) U.S. Cl. .................... 165/104.33; 165/104.21; 165/122; 165/80.3

(58) Field of Classification Search ......... 165/80.3, 165/185, 104.33, 104.21, 122, 126; 361/687, 361/695, 697–700, 702–704, 717–719; 174/15.2, 174/16.3; 257/714–715
See application file for complete search history.

(56) References Cited

U.S. PATENT DOCUMENTS

| | | | |
|---|---|---|---|
| 5,339,214 A | | 8/1994 | Nelson |
| 5,964,279 A | * | 10/1999 | Mochizuki et al. .... 165/104.33 |
| 6,333,850 B1 | | 12/2001 | Pei et al. |
| 6,407,921 B1 | * | 6/2002 | Nakamura et al. .......... 361/700 |
| 6,452,790 B1 | * | 9/2002 | Chu et al. .................... 361/683 |
| 6,466,441 B1 | * | 10/2002 | Suzuki ....................... 361/695 |
| 6,724,617 B2 | * | 4/2004 | Amaike et al. ............. 361/683 |
| 6,778,390 B2 | * | 8/2004 | Michael ...................... 361/695 |
| 6,804,117 B2 | * | 10/2004 | Phillips et al. .............. 361/700 |
| 2002/0053421 A1 | * | 5/2002 | Hisano et al. ......... 165/104.33 |
| 2002/0075643 A1 | * | 6/2002 | Nakagawa et al. ......... 361/687 |
| 2002/0114136 A1 | | 8/2002 | Cardenas |
| 2004/0163795 A1 | * | 8/2004 | Lin ............................ 165/80.3 |
| 2004/0201958 A1 | * | 10/2004 | Lev ............................. 361/687 |

FOREIGN PATENT DOCUMENTS

| | | |
|---|---|---|
| CN | 1128875 A | 8/1996 |
| CN | 2453646 Y | 10/2001 |
| CN | 1332398 A | 1/2002 |
| CN | 14314573 A | 7/2003 |
| EP | 1 175 136 A2 | 1/2002 |
| EP | 1 207 446 A1 | 5/2002 |
| JP | 62-4349 A | 1/1987 |
| JP | 11-330757 A | 11/1999 |
| JP | 2001-217366 A | 8/2001 |
| KR | 10-2003-0074156 A | 9/2003 |
| WO | WO-02/037917 A1 | 10/2002 |

* cited by examiner

*Primary Examiner*—Tho Duong
(74) *Attorney, Agent, or Firm*—Birch, Stewart, Kolasch & Birch, LLP

(57) ABSTRACT

A cooling structure for a portable computer includes a cooling fan creating an air stream to release heat generated in a main body of the computer to the outside through at least one vent. First and second heat pipes transfer heat generated in first and second heat sources on a main board of the computer to a path of the air stream. A portion of the air stream is also directed to the interior of the main body.

9 Claims, 8 Drawing Sheets

COOLING APPARATUS FOR PORTABLE COMPUTER

The present application claims, under 35 U.S.C. § 119, the priority benefit of Korean Patent Application No. P03-080761 filed Nov. 14, 2003, and Korean Patent Application No. P03-085656 filed Nov. 28, 2003. The entire contents of each of these applications are herein fully incorporated by reference.

BACKGROUND OF THE INVENTION

1. Field of the Invention

The present invention relates to a portable computer, and more particularly, to a cooling apparatus for use in a portable computer for releasing heat generated in the portable computer to the outside.

2. Description of the Related Art

Portable computers are devices, including notebook computers, tablet computers and the like, which can be used while users carry them. In the present invention, a notebook computer is used as an example of the portable computer.

FIG. 10 shows a perspective view of an external appearance of a general notebook computer. As shown in this figure, the notebook computer 1 is mainly composed of a main body 3 and a display unit 5. The display unit 5 generally includes a display 6 made of a liquid crystal panel and is connected to a rear end of the main body 3 so as to come into close contact with or to be unfolded from a top surface of the main body 3. Both the main body 3 and the display unit 5 generally have a flat hexahedral shape.

A keyboard 7 is provided on the top surface of the main body 3. A vent 9 for releasing heat generated in the main body to the outside is formed at one side of the main body 3. That is, an air stream containing the heat generated in the main body 3 is discharged to the outside through the vent 9.

As illustrated in FIG. 11, a main board 10 is installed within the main body 3. A microprocessor (CPU) 11 is mounted onto the main board 10. The microprocessor 11 controls the processing works such as command analysis, data operation and data comparison. A cooling fan unit 12 is installed within the main body 3 to release heat generated in the microprocessor 11 to the outside. The cooling fan unit 12 creates an air stream by using a cooling fan 14 installed in a fan housing 13. The fan housing 13 is in thermal contact with the microprocessor 11, and the air stream created by the cooling fan 14 flows toward the vent 9 along one side of the fan housing 13.

A cooling fin unit 15 is installed between the vent 9 and the fan housing 13. The cooling fin unit 15 is configured to allow the air stream to pass therethrough. Further, a heat pipe 16 is used to transfer the heat generated from the microprocessor 11 to the cooling fin unit 15. The heat pipe 16 extends from one side of the fan housing 13 installed on the microprocessor 11 to the cooling fin unit 15.

Furthermore, a plurality of chips 18 are mounted onto the main board 10. To easily release the heat generated from the chips 18, a cooling plate 19 is installed to come into thermal contact with the chips 18. The cooling plate 19 may be made of an aluminum or copper plate and serves to receive heat generated in the chips through heat conduction and to release the received heat to the outside.

However, the aforementioned prior art has the following problems:

The system for cooling the interior of the main body 3 has been heretofore focused onto the microprocessor 11. However, the heat generated in the chips 18 has become considerable, as the performance of the notebook computer is improved.

Therefore, if the release of heat generated from the chips 18 depends only on the heat conduction through the cooling plate 19, the heat release performance of the main body 3 is greatly reduced and the surface temperature of the main body 3 is thus excessively increased. FIG. 12 shows the heat release performance of various component parts, installed within the main body 3, when the main body 3 is cooled using a conventional cooling mode. In this graph, bars, indicated by dotted lines, represent prescribed values, whereas bars, indicated by solid lines, represent actually measured values.

SUMMARY OF THE INVENTION

Accordingly, the present invention is conceived to solve one or more of the aforementioned problems in the related art. An object of the present invention is to provide a cooling apparatus for more smoothly releasing heat generated in a main body of a portable computer to the outside.

According to an aspect of the present invention for achieving the object, there is provided a cooling apparatus for a portable computer, comprising a main body which includes a main board installed in an internal space thereof A vent allows air to flow between the internal space and the outside. A cooling fan unit includes a cooling fan provided in a fan housing, and is installed in the main body for creating an air stream to release heat generated in the main body to the outside through the vent. A first heat pipe transfers heat generated in a first heat source on the main board to a path for the air stream. A second heat pipe transfers heat generated in a second heat source on the main board to the path for the air stream. An air supply means transfers a portion of the air stream to the interior of the main body.

Preferably, the fan housing of the cooling fan unit includes at least one outlet through which the air stream created by the cooling fan is discharged. The outlet is provided with a cooling fin unit which is thermally connected to the heat pipes to transfer the heat generated in the heat sources to the air stream.

In one embodiment, the first and second heat pipes are thermally connected to the cooling fin units provided at the separate outlets, respectively.

In another embodiment, the first and second heat pipes are thermally connected to the cooling fin unit provided at a single outlet.

In yet another embodiment, the first and second heat pipes are integrally formed with each other at their ends that come into contact with the cooling fin unit.

Preferably, the first heat source is a microprocessor and the air supply means supplies air to the microprocessor.

According to another aspect of the present invention, there is provided a cooling apparatus for a portable computer, comprising a main body which includes a main board installed in an internal space thereof. A vent allows air to flow between the internal space and the outside. A cooling fan unit includes a cooling fan provided in a fan housing, and is installed in the main body for creating an air stream to release heat generated in the main body to the outside through the vent. A first heat pipe transfers heat generated in a first heat source, which is installed on the main board, to a path of the air stream and is thermally connected to the cooling fan unit. A second heat pipe transfers heat generated in a second heat source on the main board to the path of the air stream and includes an end installed to face the cooling fan in a radial direction of the cooling fan of the cooling fan unit.

Preferably, the cooling fan unit comprises a fan housing including an outlet which is open toward the vent. A cooling fan is installed in the fan housing for causing air to be introduced from the outside of the fan housing and to be discharged to the outlet. A cooling fin unit is provided at an outlet side of the cooling fan for performing heat exchange with the air stream discharged through the outlet. A heat source connection extends along a side of the fan housing and is thermally connected to the first heat source.

Preferably, a fan seating space in which the cooling fan is seated, is formed in the fan housing. A portion of the second heat pipe is seated in a seating slot formed on the fan housing and exposed toward the fan seating space in a radial direction of the cooling fan.

Preferably, the other end of the second heat pipe is connected to a cooling plate that is thermally connected to the second heat source on the main board.

Also preferably, the first heat source is a microprocessor and the air supply means supplies air to the microprocessor.

According to the cooling apparatus for a portable computer of the present invention, there is an advantage in that heat generated not only from the microprocessor of the portable computer, but also from several other heat sources on the main board, can be effectively released to the outside.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, preferred embodiments of a cooling structure for a portable computer according to the present invention will be described in detail with reference to the accompanying drawings.

Figure 1:
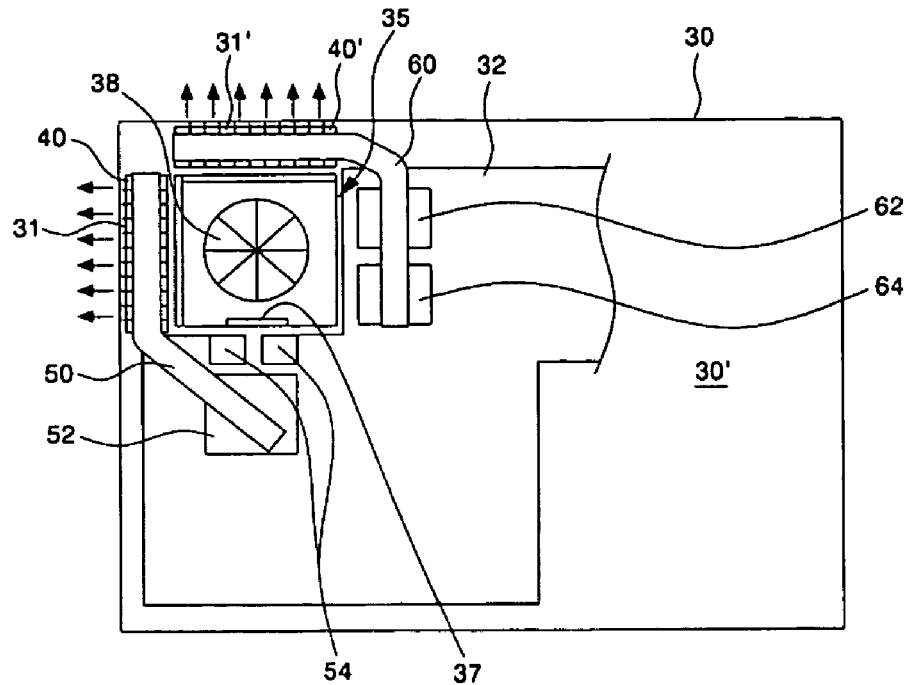
FIG. 1 is a plan view showing a portable computer with a first embodiment of a cooling apparatus, according to the present invention.
Figure 2A:
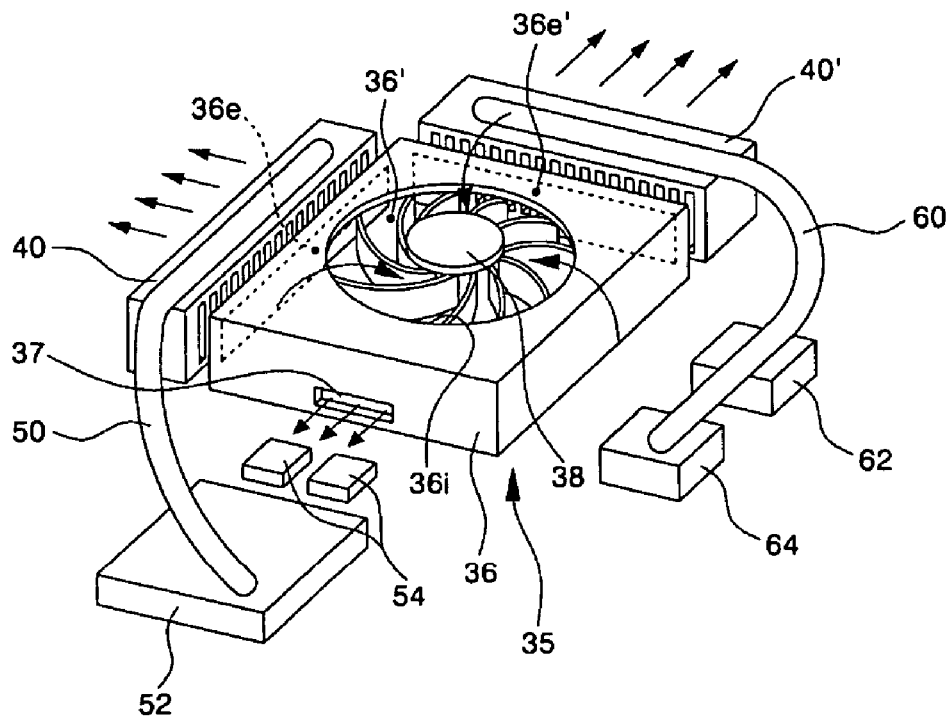
FIG. 2*a* is a schematic perspective view showing the cooling apparatus of FIG. 1.
Figure 2B:
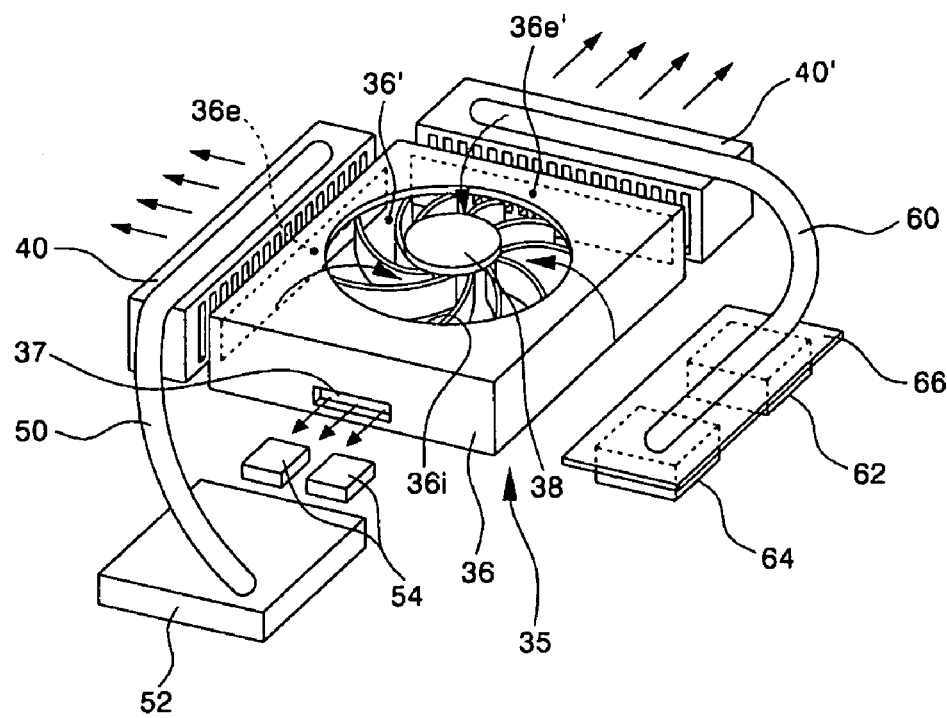
FIG. 2*b* is a schematic perspective view showing a modified cooling apparatus, according to the present invention.

FIG. 1 shows a plan view of the interior of a main body of the portable computer to which a first embodiment of a cooling structure of the present invention is applied, FIG. 2*a* shows a schematic perspective view of the cooling apparatus of the first embodiment according to the present invention, and FIG. 2*b* is a schematic perspective view showing a modified example of the first embodiment according to the present invention.

As shown in these figures, a predetermined internal space 30' is defined within a main body 30 of the portable computer. Vents 31 and 31' are formed at sides of the main body 30. In this embodiment, the vents 31 and 31' are formed at a corner of the main body 30 to be adjacent to each other. The vents 31 and 31' allow the internal space 30' to communicate with the outside of the main body 30 such that an air stream can be created in the main body. A main board 32 is installed within the internal space 30' of the main body 30. Various kinds of component parts of the portable computer are also mounted onto the main board 32.

Further, a cooling fan unit 35 is installed within the internal space 30'. The cooling fan unit 35 is provided at a position corresponding to the vents 31 and 31'. The cooling fan unit 35 is composed of a fan housing 36 and a cooling fan 38, and a fan seating space 36' is also formed in the fan housing 36.

The fan seating space 36' communicates with the outside through an inlet 36*i* formed in the fan housing 36. The inlets 36*i* may be formed on top and bottom surfaces of the fan housing 36. In this embodiment, the inlet 36*i* is formed at only the top surface of the fan housing 36. First and second outlets 36*e* and 36*e*' are formed at sides of the fan housing 36 corresponding to the vents 31 and 31'.

In the meantime, an air supply port 37 is formed in the fan housing 36. The air supply port 37 serves to transfer relatively low temperature air toward a microprocessor 52 to be explained later and allows the fan seating space 36' in the fan housing 36 to communicate with the outside of the fan housing 36. The air supply port 37 is formed to be open toward the microprocessor 52.

The cooling fan 38 creates an air stream for cooling the internal space of the main body and is seated into the fan seating space 36'. The cooling fan 38 causes air to be introduced into the inlet 36*i* and creates an air stream to be discharged toward the outlets 36*e* and 36*e*' and the air supply port 37.

First and second cooling fin units 40 and 40' are installed at positions corresponding to the outlets 36*e* and 36*e*'. The cooling fin units 40 and 40' are formed such that the air can pass through the interior of the cooling fin units. The cooling fin units 40 and 40' are positioned between the outlets 36*e* and 36*e*' and the vents 31 and 31', respectively, so that the air discharged from the outlets 36*e* and 36*e*' flows into the vents 31 and 31' to perform desired heat exchange.

Furthermore, a first heat pipe 50 is installed to be thermally connected to the cooling fin unit 40. The first heat pipe 50 is configured in such a manner that its one end is installed along the cooling fin unit 40 and the other end extends from the cooling fin unit 40 at a desired length. The first heat pipe 50 serves to transfer heat from a relatively high temperature point to a relatively low temperature point. Here, the heat pipe serves to transfer heat from one end to the other end while working fluid filled in the heat pipe, goes through a phase change due to the heat applied thereto.

The first heat pipe 50 extends up to the microprocessor 52 installed on the main board 32. That is, the other end of the first heat pipe 50 is thermally connected to the microprocessor 52. At least one power control chip 54 is mounted onto the main board 32 at a position adjacent to the microprocessor 52. In this embodiment, power control chips 54 are mounted at a position close to the air supply port 37 whereas the microprocessor 52 is positioned opposite to the air supply port 37. Therefore, the air discharged from the air supply port 37 passes sequentially by the power control chips 54 and the microprocessor 52, so as to cool them.

A second heat pipe 60 is thermally connected to the cooling fin unit 40', installed at the outlet 36e' of the fan housing 36. The second heat pipe 60 is configured in such a manner that one end is installed along a top surface of the cooling fin unit 40' and the other end extends from the cooling fin unit 40' at a desired length.

The extended end of the second heat pipe 60 is thermally connected to a main chipset 62 and a graphic chipset 64, which are mounted onto the main board 32. In this embodiment, the second heat pipe 60 is sequentially connected to the main chipset 62 and the graphic chipset 64.

As shown in FIG. 2b, however, the second heat pipe 60 may be thermally connected to an additional cooling plate 66 that comes into simultaneous contact with top surfaces of the main chipset 62 and the graphic chipset 64.

Next a second embodiment of the present invention is described with reference to FIGS. 3 and 4. In this embodiment, reference numerals with 100 added thereto are used to designate the components similar to those of the first embodiment, for the sake of explanation.

A predetermined internal space 130' is defined within a main body 130 of the portable computer. A vent 131 is formed at a side of the main body 130. In this embodiment, the vent 131 is formed at a corner of the main body 130. The vent 131 allows the internal space 130' to communicate with the outside of the main body 130 such that an air stream can be created in the main body. A main board 132 is installed within the internal space 130' of the main body 130. Various kinds of component parts of the portable computer are also mounted onto the main board 132.

Further, a cooling fan unit 135 is installed within the internal space 130'. The cooling fan unit 135 is provided at a position corresponding to the vent 131. The cooling fan unit 135 is composed of a fan housing 136 and a cooling fan 138, and a fan seating space 136' is also formed in the fan housing 136.

The fan seating space 136' communicates with the outside through an inlet 136i formed in the fan housing 136. The inlet 136i may be formed on top and bottom surfaces of the fan housing 136. In this embodiment, the inlet 136i is formed at only the top surface of the fan housing 136. An outlet 136e is formed at a side of the fan housing 136 corresponding to the vent 131.

In the meantime, an air supply port 137 is formed in the fan housing 136. The air supply port 137 serves to transfer relatively low temperature air toward a microprocessor 152 to be explained later and allows the fan seating space 136' in the fan housing 136 to communicate with the outside of the fan housing 136. The air supply port 137 is formed to be open toward the microprocessor 152 and power control chips 154.

The cooling fan 138 creates an air stream for cooling the internal space of the main body and is seated into the fan seating space 136'. The cooling fan 138 causes air to be introduced into the inlet 136i and creates an air stream to be discharged toward the outlet 136e and air supply port 137.

A cooling fin unit 140 is installed at a position corresponding to the outlet 136e. The cooling fin unit 140 is formed such that the air can pass through the interior of the cooling fin unit. The cooling fin unit 140 is positioned between the outlet 136e and the vent 131, so that the air discharged from the outlet 136e flows into the vent 131 to perform desired heat exchange.

Furthermore, a first heat pipe 150 is installed to be thermally connected to the cooling fin unit 140. The first heat pipe 150 is configured in such a manner that one end is installed along the cooling fin unit 140 and the other end extends from the cooling fin unit 140 at a desired length. The first heat pipe 150 serves to transfer heat from a relatively high temperature point to a relatively low temperature point.

The first heat pipe 150 extends up to the microprocessor 152 installed on the main board 132. That is, the other end of the first heat pipe 150 is thermally connected to the microprocessor 152. At least one power control chip 154 is mounted onto the main board 132 at a position adjacent to the microprocessor 152. In this embodiment, the microprocessor 152 and the power control chips 154 are mounted in parallel at a position close to the air supply port 137.

A second heat pipe 160 is also thermally connected to the cooling fin unit 140 installed at the outlet 136e of the fan housing 136. The second heat pipe 160 is configured in such a manner that its one end is installed in parallel with the first heat pipe 150 along a top surface of the cooling fin unit 140 and the other end extends from the cooling fin unit 140 at a desired length.

The extended end of the second heat pipe 160 is thermally connected to a main chipset 162 and a graphic chipset 164, which are mounted onto the main board 132. In this embodiment, the second heat pipe 160 is sequentially connected to the main chipset 162 and the graphic chipset 164. However, the second heat pipe 160 may be thermally connected to an additional cooling plate that comes into simultaneous contact with top surfaces of the main chipset 162 and the graphic chipset 164.

Figure 5:
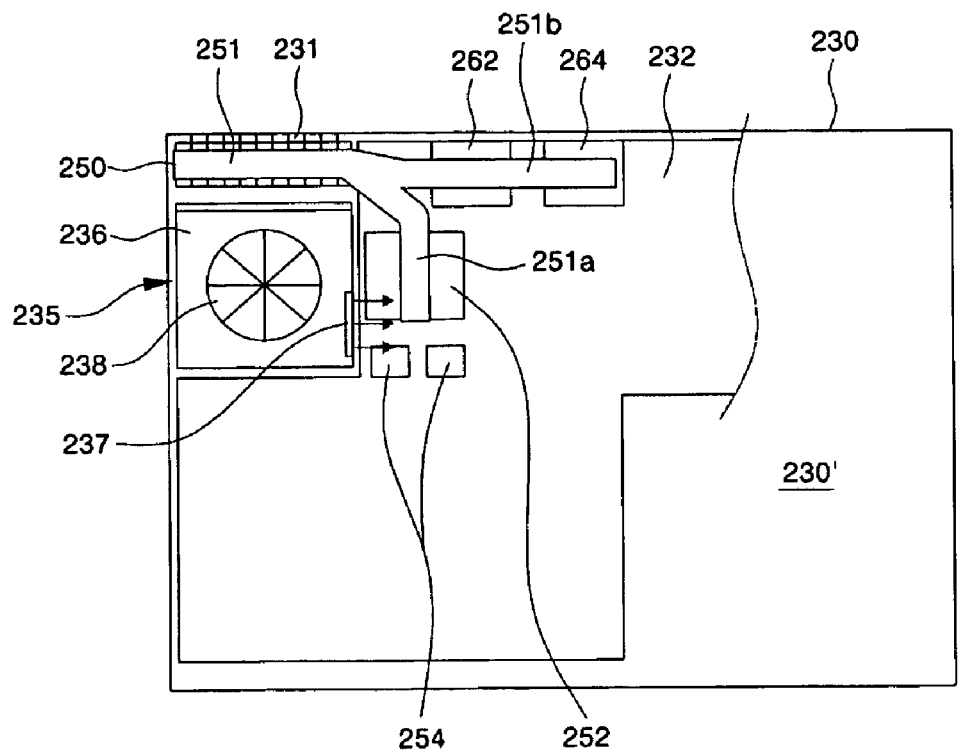
FIG. 5 is a plan view showing the configuration of a third embodiment of a cooling apparatus, according to the present invention.

Next, a third embodiment of the present invention is described with reference to FIG. 5. In this embodiment, reference numerals with 200 added thereto are used to designate the components similar to those of the first embodiment, for the sake of explanation. One configuration of the third embodiment will be hereinafter explained.

In this embodiment, a single cooling fin unit 240 is installed between a cooling fan unit 235 and a vent 231. A first end 251 of the cooling fin unit 240 is connected to a heat pipe 250. The first end 251 of the heat pipe 250 is branched off into a second end 251a and a third end 251b at a position beyond the cooling fin unit 240.

The first end 251 is thermally connected to the heat pipe 250, whereas the second end 251a is thermally connected to a microprocessor 252. Further, the third end 251b is thermally connected to a main chipset 262 and a graphic chipset 264. That is, in this embodiment, a single heat pipe 250 can transfer heat generated in the microprocessor 252 and in the main chipset 262 and the graphic chipset 264 to the cooling fin unit 240.

It is shown in this figure that the third end 251b is sequentially connected to the main chipset 262 and the graphic chipset 264. However, this embodiment may be configured in such a manner that the third end 251b is thermally connected to an additional cooling plate that comes into simultaneous contact with top surfaces of the main chipset 262 and the graphic chipset 264.

Figure 6:
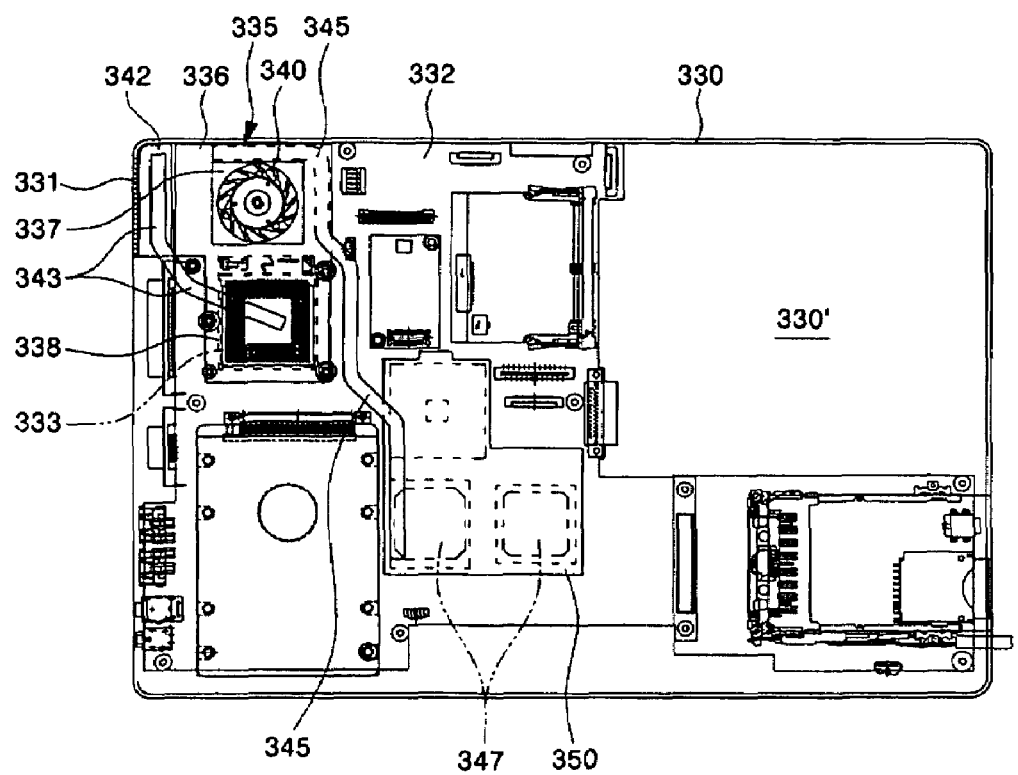
FIG. 6 is a plan view showing the configuration of a fourth embodiment if a cooling apparatus, according to the present invention.
Figure 7:
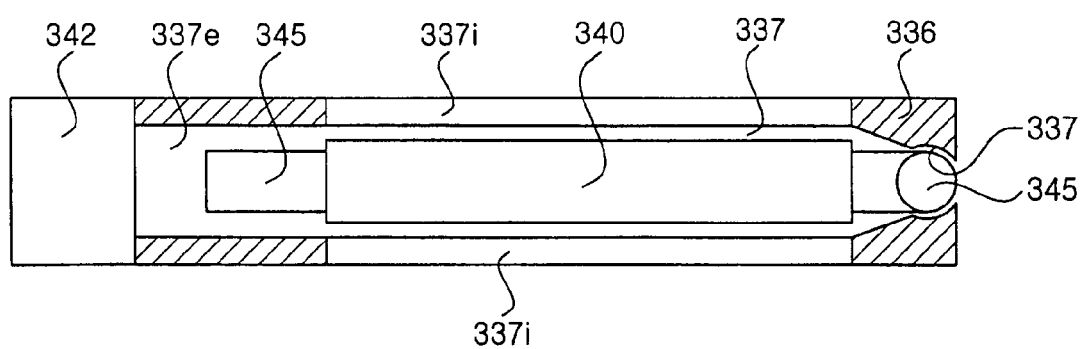
FIG. 7 is a cross sectional view of a cooling fan unit of the fourth embodiment of the present invention.
Figure 8:
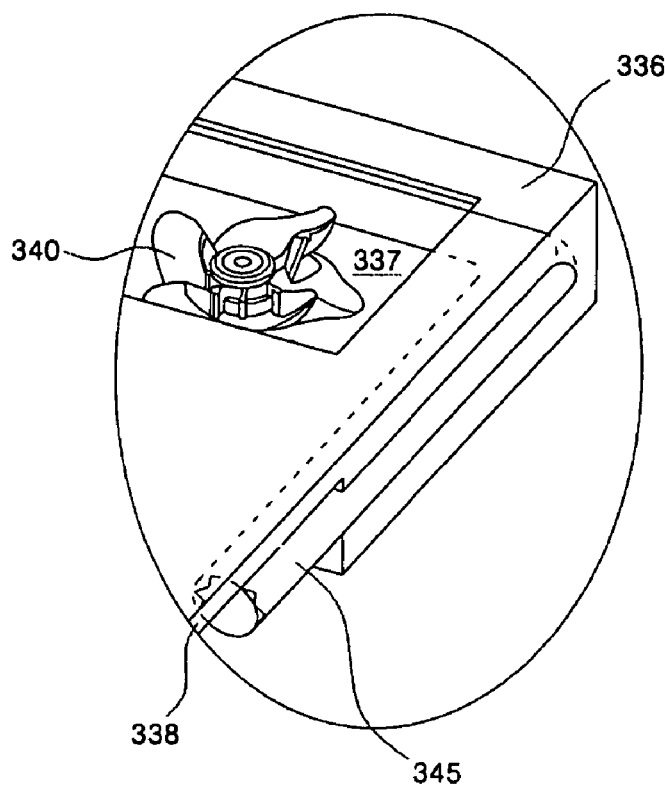
FIG. 8 is a partial perspective view showing the cooling fan unit of the fourth embodiment of the present invention.

FIGS. 6 to 8 show the configuration of a fourth embodiment of the present invention. As shown in these figures, a predetermined internal space 330' is defined within a main body 330 of the portable computer. A vent 331 is formed on at least one side of the main body 330. The vent 331 allows the internal space 330' to communicate with the outside of the main body 330 such that an air stream can be created in the main body 330.

A main board 332 is installed within the internal space 330' of the main body 130. Various kinds of component parts of the portable computer are mounted onto the main board 332. First of all, a microprocessor 333 is installed on the main board 332. The microprocessor 333 is a key component of the portable computer and controls the processing works such as command analysis, data operation and data comparison. In operation, the microprocessor 333 produces a great deal of heat.

Further, a cooling fan unit 335 for releasing heat generated in the main body 330 is provided within the internal space 330' of the main body 330. It is preferred that the cooling fan unit 335 be installed at a position corresponding to the vent 331.

The cooling fan unit 335 includes a fan housing 336 in which a fan seating space 336' is formed. To communicate the fan seating space 337 with the outside, an inlet 337i is formed on a top surface of the fan housing 336. The inlet 337i becomes a passage, through which air is introduced from the internal space 330' into the fan seating space 337. At one side of the fan housing 336 is formed an outlet 337e corresponding to a passage through which air is discharged from the fan seating space 337 to the outside of the fan housing 336. The outlet 337e is formed to open toward the vent 331.

A seating slot 337' is formed in the fan housing 336 to be open toward the interior of the fan seating space 337. The seating slot 337' is formed at portions in the fan housing outwardly beyond a cooling fan 340 installed within the fan seating space 337 except portions where the outlet 337e and a heat source connection 338, to be explained later, are formed. An end of a second heat pipe 345 to be explained later is positioned in the seating slot 337'.

The heat source connection 338 is formed to extend along one side of the fan housing 336. The heat source connection 338 is thermally connected to the microprocessor 333 to transfer heat generated in the microprocessor 333 to the fan housing 336. Therefore, the heat source connection 338 extends from the fan housing 336 in a direction in which the microprocessor 333 is installed. Further, it is preferred that the fan housing 336 and the heat source connection 338 be made of a good heat transfer material.

The cooling fan 340 is installed within the fan seating space 337 of the fan housing 336. The cooling fan 340 causes air to be introduced through the inlet 337i and then to be discharged into the fan seating space 337 in a centrifugal direction. Then, the air discharged as such is further discharged from the fan seating space 337 through the outlet 337e.

A cooling fin unit 342 is installed on the outlet 337e of the fan housing 336. The cooling fin unit 342 is made of a good heat transfer material and also configured to allow air to pass therethrough. Therefore, the cooling fin unit 342 causes the outlet 337e and the vent 331 to communicate with each other and allows the air stream created by the cooling fan 340 to be discharged through the vent 331.

As mentioned above, one end of the second heat pipe 345 is positioned in the seating slot 337' of the fan housing 336. As well shown in FIGS. 7 and 8, a portion of the second heat pipe 345 is exposed into the fan seating space 337. That is, a certain length of the second heat pipe 345 is exposed toward the fan seating space 337 in a radial direction of the cooling fan 340 such that the air discharged from the cooling fan 340 can be brought into contact with the exposed portion of the second heat pipe 345.

The second heat pipe 345 extends from the cooling fan unit 335 to another heat source, i.e. a chip or chips 347, installed on the main board 332 and transfers heat generated in the chip or chips 347 to the cooling fan unit 335. At least one of a memory chipset, a main chipset, and a graphic chipset or the like are an example of the chip or chips 347. A cooling plate 350 is used such that the heat generated in the chip(s) 347 can be effectively released by using the second heat pipe 345. The cooling plate 350 is thermally connected to the plurality of chips 347 and absorbs the heat generated in the chips 347. It is preferred that the cooling plate 350 be made of aluminum or copper.

Hereinafter, the operation of the cooling structure for the portable computer according to the present invention will be described in detail.

The cooling operation performed in the first embodiment of the cooling structure shown in FIGS. 1 and 2 is first explained. To release heat generated due to the operation of the portable computer, the cooling fan 38 is driven. As the cooling fan 38 is driven, air, in the internal space 30' of the main body 30, flows into the cooling fan 38 through the inlet 36i.

The air introduced into the cooling fan 38 is discharged in an outward radial direction from the cooling fan 38 and delivered into the first and second outlets 36e and 36e'. Then, the desired heat exchange is performed between the air delivered into the first outlet 36e and the first cooling fin unit 40 while the air passes through the first cooling fin unit 40. At this time, heat transferred form the microprocessor 52 through the first heat pipe 50 is transferred to the air passing through the first cooling fin unit 40. The heated air is then discharged to the outside of the main body 30 through the vent 31.

Further, a portion of the air discharged from the cooling fan 38 is discharged from the fan housing 36 through the second outlet 36e'. Then, the desired heat exchange is performed between the discharged air and the second cooling fin unit 40' while the air passes through the second cooling fin unit 40'. At this time, heat transferred from the main chipset 62 and the graphic chipset 64 through the second heat pipe 60 is transferred to the air passing through the second cooling fin unit 40'. The heated air is then discharged to the outside of the main body 30 through the vent 31'.

Furthermore, air passing through the air supply port 37 from the cooling fan 38 is delivered toward the power control chip 54 and the microprocessor 52 and releases heat generated therein. Arrows shown in FIG. 2a denote such air flow in this embodiment of the present invention.

Next, the cooling operation in the second embodiment is explained with reference to FIGS. 3 and 4. In this embodiment, only a single outlet 136e is formed in the fan housing 136 of the cooling fan unit 135 and the heat transferred through the first and second heat pipes 150 and 160 is transferred to the air passing through the cooling fin unit 140 provided close to the outlet 136e.

If the cooling fan 138 is driven, air is delivered from the outside of the fan housing 136 to the cooling fan 138 through the inlet 136*i*. The air delivered into the cooling fan 138 is discharged in an outward radial direction from the cooling fan 138 and delivered into the outlet 136*e*. Then, the desired heat exchange is performed between the air delivered into the outlet 136*e* and the cooling fin unit 140 while the air passes through the cooling fin unit 140. At this time, heat transferred from the microprocessor 152 and the chipsets 162 and 164 through the first and second heat pipes 150 and 160 is transferred to the air passing through the cooling fin unit 140.

Further, air passed through the air supply port 137 from the cooling fan 138 is delivered toward the power control chip 154 and the microprocessor 152 and releases heat generated therein.

When comparing a case where only a single outlet 136*e* is formed in the fan housing 136 with a case where two outlets 136*e* and 136*e'* are formed in the fan housing 136, pressure loss of the air stream in the former case is lower than that in the latter case, whereas flow loss in the former case is greater than that in the latter case. In other words, the latter case is advantageous in view of the flow rate even though its pressure loss is relatively large.

Figure 3:
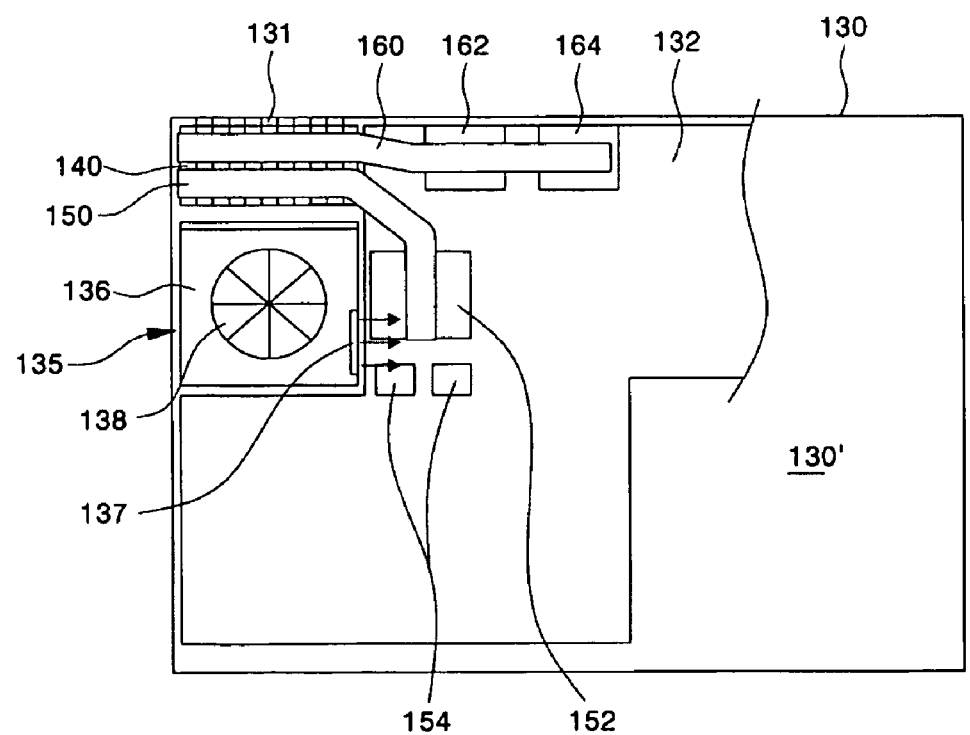
FIG. 3 is a plan view showing the configuration of a second embodiment of a cooling apparatus, according to the present invention.
Figure 4:
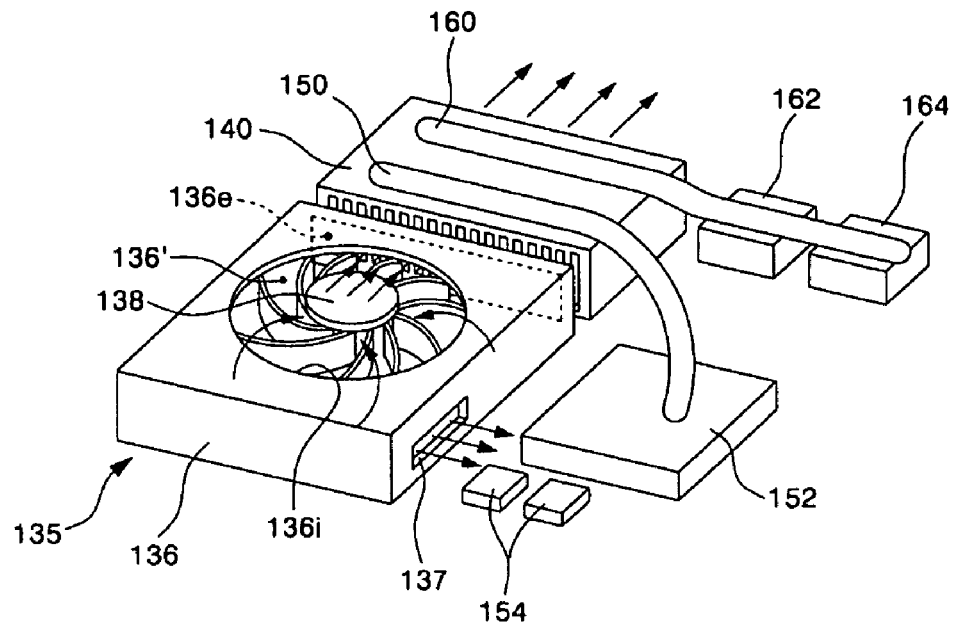
FIG. 4 is a schematic perspective view showing the cooling apparatus of FIG. 3.

The air flow in the third embodiment shown in FIG. 3 is the same as that in the second embodiment. However, the third embodiment is different from the second embodiment in that it employs only a single heat pipe 250 when transferring heat to the cooling fin unit 240. That is, Heat generated in the microprocessor 252 is transferred from the second end 251*a* to the first end 251 of the heat pipe 250, and heat generated in the main chipset 262 or graphic chipset 264 is transferred from the third end 251*b* to the first end 251 of the heat pipe 250.

The heat transferred to the first end 251 of the heat pipe 250 is again transferred to an air stream created by the cooling fan unit 235 and then released to the outside through the vent 231.

In such a case, in order to perform the desired heat exchange, only a single heat pipe 250 is used and only the first end 251 of the heat pipe is brought into thermal contact with the cooling fin unit 240. Therefore, an area occupied by the heat pipe 250 and cooling fin unit 240 in the internal space 230' can be minimized.

Finally, the operation of the fourth embodiment of the present invention is described. In this embodiment, when the computer is operated, the cooling fan unit 335 creates an air stream to release heat generated in the main body 330 to the outside.

That is, as the cooling fan 340 is rotated, air in the internal space 330' of the main body 330 is introduced into the cooling fan 340 through the inlet 337*i*. The air introduced into the cooling fan 340 is discharged to the fan seating space 337 and then to the outlet 337*e* in an outward radial direction of the cooling fan 340, due to the rotation of the cooling fan. At this time, the desired heat exchange is performed between the air discharged to the outlet 337*e* and the cooling fin unit 342 while the air passes through the cooling fin unit 342. Then, the air passed through the cooling fin unit 342 is discharged to the outside of the main body 330 via the vent 331.

It is now explained how the heat generated in the microprocessor 333 and the chip(s) 347 is released to the outside due to the creation of the air stream. The heat generated in the microprocessor is transferred to the cooling fan unit 335 through the heat source connection 338 and the first heat pipe 343. A portion of the heat transferred through the heat source connection 338 is transferred to the cooling fan unit 335 and then released, by causing the air stream created by the cooling fan 340 to be brought into contact with inner surfaces of the fan seating space 337.

In addition, the first heat pipe 343 transfers heat generated in the microprocessor 333 to the cooling fin unit 342. The heat transferred to the cooling fin unit 342 is transferred to the air discharged from the fan seating space 337 through the outlet 337*e* when the air passes through the cooling fin unit 342.

Furthermore, heat generated in the chip(s) 347 is conducted to the cooling plate 350. The heat conducted to the cooling plate 350 is also transferred to the cooling fan unit 335 through the second heat pipe 345. The heat transferred from the cooling plate 350 to the second heat pipe 345 is also transferred to the air stream created by the cooling fan 340 through a portion of the second heat pipe 345 that is seated in the seating slot 337' of the fan housing 336 and exposed toward the fan seating space 337.

A portion of the second heat pipe 345 is exposed into the fan seating space 337 in a radial direction of the cooling fan 340, such that the air stream created by the cooling fan 340 can be brought into direct contact with the exposed portion of the second heat pipe 345 to perform the desired heat exchange therebetween.

Figure 9:
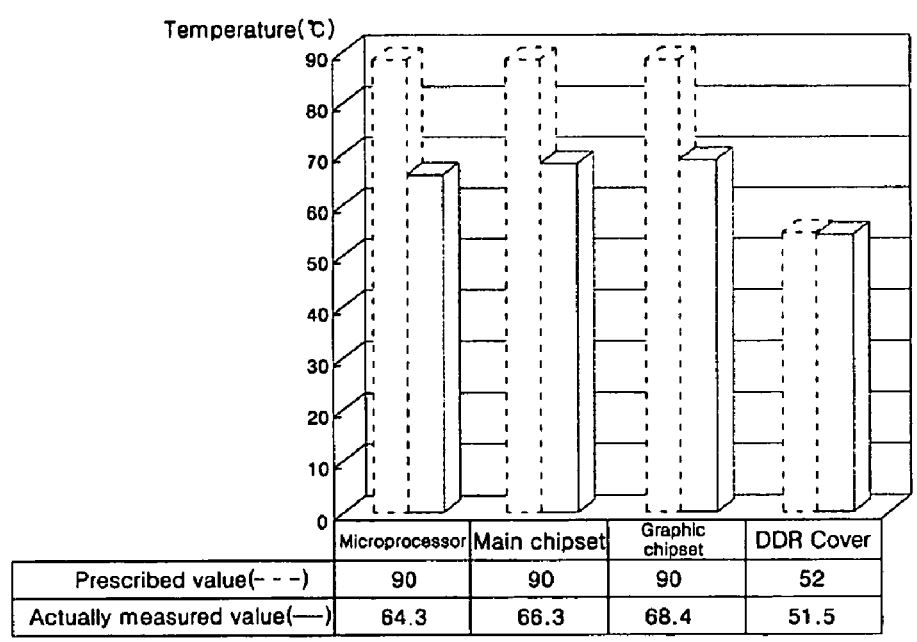
FIG. 9 is a graph illustrating a cooling result of the fourth embodiment of the present invention.
Figures 10, 11:
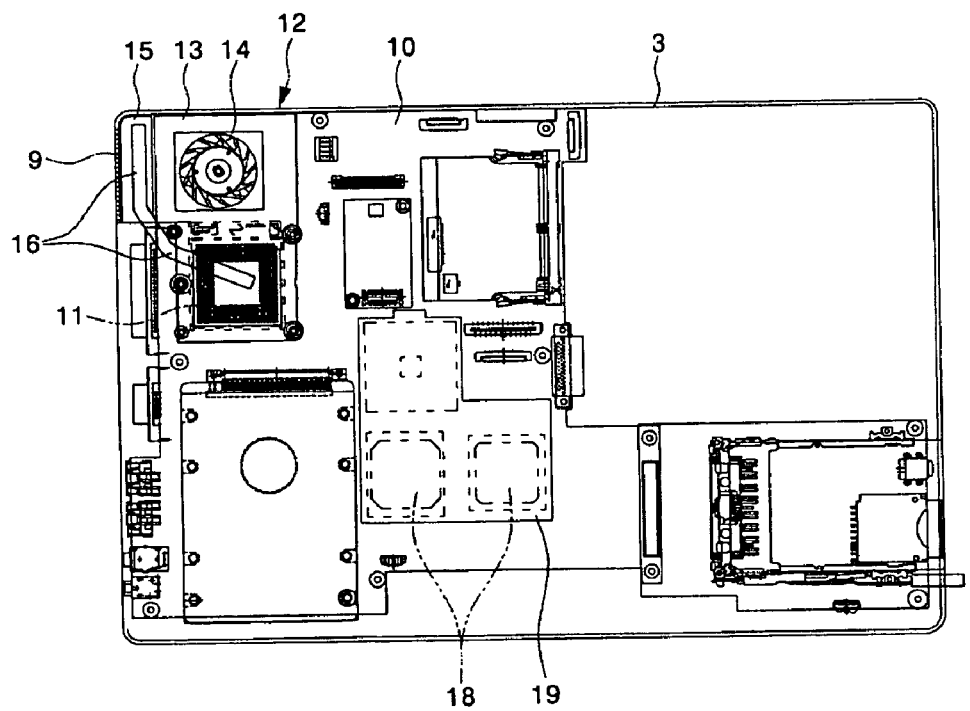
FIG. 10 is a perspective view of a portable computer, in accordance with the related art.
FIG. 11 is a plan view showing an internal cooling apparatus of the portable computer of FIG. 10.
Figure 12:
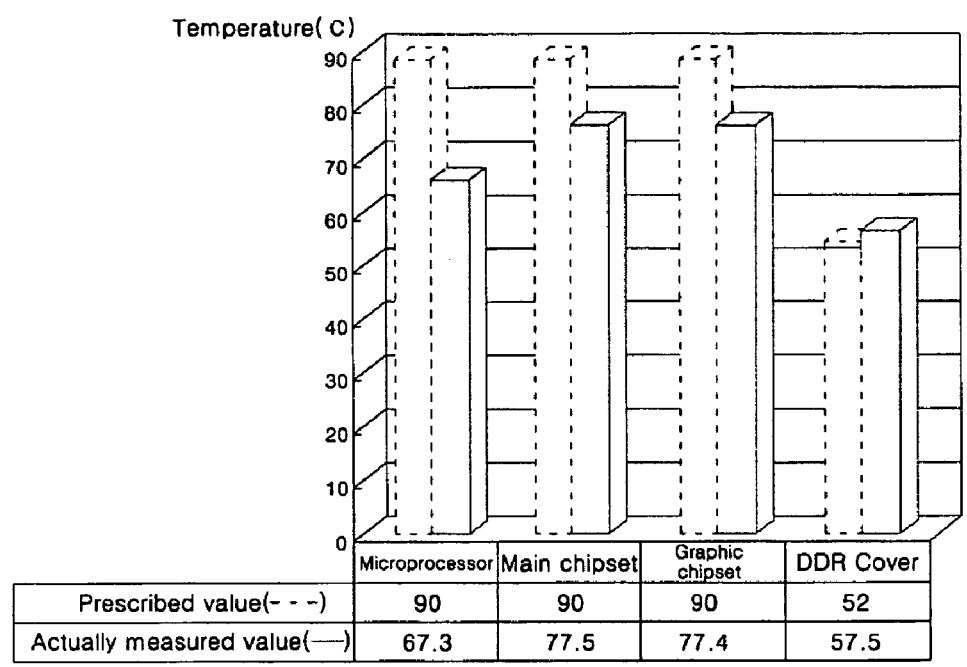
FIG. 12 is a graph illustrating a cooling result of the related art cooling apparatus.

Meanwhile, FIG. 9 is a graph illustrating the cooling performance of the preferred embodiments of the present invention. In FIG. 9, bars indicated by dotted lines represent prescribed values, whereas bars indicated by solid lines represent actually measured values. As seen from this figure, the cooling performance of the chips 347, as well as the microprocessor 333, is further improved as compared with the related art cooling structure. In particular, it can be understood that the temperature of a DDR cover is lowered below its relevant prescribed value. This means that the total cooling performance of the main body 330 was improved because the cooling structure of the present invention has been employed.

According to the cooling structure for the portable computer of the present invention as described above in detail, the following advantages can be obtained.

According to the present invention, a single cooling fan unit can release heat generated in a plurality of the chipsets, as well as the microprocessor, to the outside of the portable computer. Therefore, since the heat generated in the main body of the portable computer can be effectively released, there is an advantage in that the total cooling performance of the portable computer is improved. Furthermore, the internal space of the main body can be efficiently utilized and the thermal management for the portable computer can also be efficiently made.

The scope of the present invention is not limited by the illustrated embodiment but defined by the appended claims. It will be apparent that those skilled in the art can make various modifications and changes within the scope of the invention defined by the claims.

What is claimed is:

1. A cooling apparatus for a computer, comprising:
   a cooling fan unit for creating at least one air stream to remove heat generated inside a main body of a computer to the outside through at least one vent, said cooling fan unit including a cooling fan;
   a first heat pipe for transferring heat generated in a first heat source in the computer to a first location for cooling by the at least one air stream, the first heat source being located adjacent to and facing one side of the cooling fan unit in which an air supply port is located for supplying air from the cooling fan unit to the first heat source;

a second heat pipe for transferring heat generated in a second heat source, distanced from the first heat source and located adjacent to and facing a different, non-vented, side of the cooling fan unit in the computer, to a second location for cooling by the at least one air stream, wherein:
said at least one vent includes a first vent and a second vent;
said first location for cooling is located proximate said first vent;
said second location for cooling is located proximate said second vent;
said first vent is located on a first side of said cooling fan unit; and said second vent is located on a different side of said cooling fan unit.

2. The cooling apparatus according to claim 1, wherein:
said at least one air stream includes a first air stream and a second air stream;
said first location for cooling is a first cooling fm unit which allows the first air stream to pass therethrough; and
said second location for cooling is a second cooling fin unit which allows the second air stream to pass therethrough.

3. The cooling apparatus according to claim 1, wherein said first and second heat pipes enclose a fluid or gas.

4. The cooling apparatus according to claim 1, wherein an end of said second heat pipe is coupled to a cooling plate for thermally coupling to the second heat source.

5. A cooling apparatus for a computer, comprising:
a cooling fan unit having a housing with air inlets in its top and in bottom surfaces for creating at least one air stream to remove heat generated inside a main body of a computer to the outside through at least one vent, said cooling fan unit including a cooling fan;
a heat source connection;
a first heat pipe coupled to said heat source connection for transferring heat away from said heat source connection to a first location for cooling by the at least one air stream, the heat source connection being located adjacent to and facing one side of the cooling fan unit in which an air supply port is located for supplying air from the cooling fan unit to the heat source connection;
a cooling plate adjacent to and facing a non-vented side of the cooling fan unit;
a second heat pipe coupled to said cooling plate for transferring heat away from said cooling plate to a second location for cooling by the at least one air stream, wherein:
said at least one vent includes a first vent and a second vent;
said first location for cooling is located proximate said first vent;
said second location for cooling is located proximate said second vent;
said first vent is located on a first side of said cooling fan unit; and
said second vent is located on a different side of said cooling fan unit.

6. The cooling apparatus according to claim 5, wherein:
said at least one air stream includes a first air stream and a second air stream;
said first location for cooling is a first cooling fm unit which allows the first air stream to pass therethrough; and
said second location for cooling is a second cooling fin unit which allows the second air stream to pass therethrough.

7. A cooling apparatus for a computer, comprising:
a cooling fan means located in a housing having air inlets in its top and bottom surfaces for creating at least one air stream to remove heat generated inside a main body of a computer to the outside through at least one vent, said cooling fan means including a cooling fan;
a first heat transferring means for transferring heat generated in a first heat source in the computer to a first location for cooling by the at least one air stream, the first heat source being located adjacent to and facing one side of the cooling fan unit in which an air supply port is located for supplying air from the cooling fan unit to the first heat source;
a second heat transferring means for transferring heat generated in a second heat source adjacent to and facing a non-vented side of the cooling fan unit, distanced from the first heat source in the computer, to a second location for cooling by the at least one air stream, wherein:
said at least one vent includes a first vent and a second vent;
said first location for cooling is located proximate said first vent;
said second location for cooling is located proximate said second vent;
said first vent is located on a first side of said cooling fan means; and
said second vent is located on a different side of said cooling fan means.

8. The cooling apparatus according to claim 7, wherein said first heat transferring means includes a first pipe and said second heat transferring means includes a second pipe.

9. A computer comprising:
a main body including at least one vent;
a cooling fan unit having a housing with air inlets in its top and bottom surfaces for creating at least one air stream to remove heat generated inside said main body of said computer to the outside through said at least one vent, said cooling fan unit including a cooling fan;
a motherboard including a microprocessor and at least one of a memory chipset, a graphic chipset, and a main chipset;
a first heat pipe transferring heat generated by said microprocessor to a first location for cooling by the at least one air stream, the microprocessor being located adjacent to and facing one side of the cooling fan unit in which an air supply port is located for supplying air from the cooling fan unit to the microprocessor;
a second heat pipe transferring heat generated by said at least one of said memory chipset, said graphic chipset, and said main chipset adjacent to and facing a non-vented side of the cooling fan unit, to a second location for cooling by the at least one air stream, wherein:
said at least one vent includes a first vent and a second vent;
said first location for cooling is located proximate said first vent;
said second location for cooling is located proximate said second vent;
said first vent is located on a first side of said main body; and
said second vent is located on a different side of said main body.

* * * * *